(12) United States Patent  
Sukegawa et al.

(10) Patent No.: US 8,861,801 B2  
(45) Date of Patent: Oct. 14, 2014

(54) FACIAL IMAGE SEARCH SYSTEM AND FACIAL IMAGE SEARCH METHOD

(75) Inventors: Hiroshi Sukegawa, Yokohama (JP); Osamu Yamaguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 13/418,483

(22) Filed: Mar. 13, 2012

(65) Prior Publication Data

US 2012/0308090 A1 Dec. 6, 2012

(30) Foreign Application Priority Data

Jun. 6, 2011 (JP) ................................ 2011-126734

(51) Int. Cl.  
*G06K 9/00* (2006.01)

(52) U.S. Cl.  
USPC ............ 382/118; 382/190; 382/209; 382/224

(58) Field of Classification Search  
None  
See application file for complete search history.

(56) References Cited

U.S. PATENT DOCUMENTS

| | | | | |
|---|---|---|---|---|
| 8,111,942 B2* | 2/2012 | Farrer et al. | ................... | 382/274 |
| 8,401,294 B1* | 3/2013 | Allen | ............................ | 382/181 |
| 2008/0085037 A1* | 4/2008 | Segawa et al. | ................ | 382/118 |
| 2010/0106707 A1* | 4/2010 | Brown et al. | ................. | 707/711 |
| 2011/0074970 A1 | 3/2011 | Sukegawa | | |

FOREIGN PATENT DOCUMENTS

| | | |
|---|---|---|
| JP | 06-259308 A | 9/1994 |
| JP | A-2007-004767 | 1/2007 |
| JP | 2007-310646 A | 11/2007 |
| JP | A-2011-170711 | 9/2011 |
| JP | A-2012-003623 | 1/2012 |
| KR | 1020090093904 A | 9/2009 |

OTHER PUBLICATIONS

Background Art Information Sheet (2 pages).  
Watanabe, Tomoki et al. "Co-occurrence Histograms of Oriented Gradients for Pedestrian Detection." *In Proceedings of the 3rd Pacific-Rim Symposium on Image and Video Technology (PSIVT2009)* (2009): pp. 37-47.  
U.S. Appl. No. 13/419,694, filed Mar. 14, 2012, Saito et al.  
Yamaguchi, Osamu et al. "Face Recognition System using Temporal Image Sequence." *The Institute of Electronics, Information and Communication Engineers PRMU.* vol. 97, No. 13 (1997): pp. 17-24.  
Oja, E. "Subspace Methods of Pattern Recognition." *Research Studies Press Ltd.* (1986).  
U.S. Appl. No. 13/588,229, filed Aug. 17, 2012, Saito et al.  
Office Action mailed Mar. 19, 2013 in corresponding KR patent application No. 10-2012-23536 (and English translation).

* cited by examiner

*Primary Examiner* — Jason M Repko  
*Assistant Examiner* — David Perlman  
(74) *Attorney, Agent, or Firm* — Posz Law Group, PLC

(57) ABSTRACT

According to one embodiment, a facial image search system including attribute discrimination module configured to discriminate attribute based on facial feature extracted, a plurality of search modules configured to store facial feature as database in advance, add facial feature extracted to database, calculate degree of similarity between facial feature extracted and facial feature contained in database, setting module configured to generate setting information by associating with any attribute with information indicating search module, and control module configured to identify one or a plurality of search modules based on setting information and attribute and transmit facial feature extracted by feature extraction module to identified search modules.

12 Claims, 12 Drawing Sheets

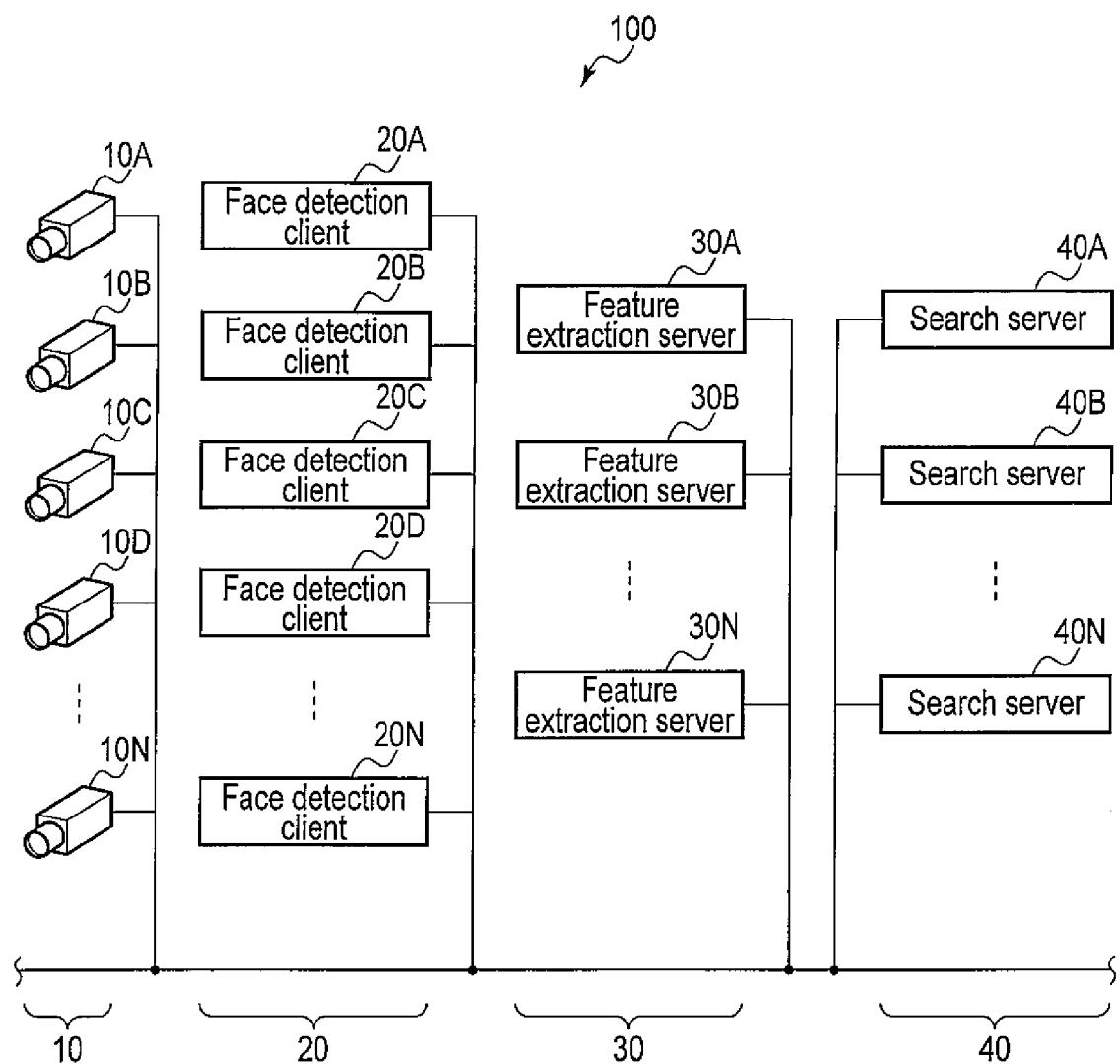
F I G. 1

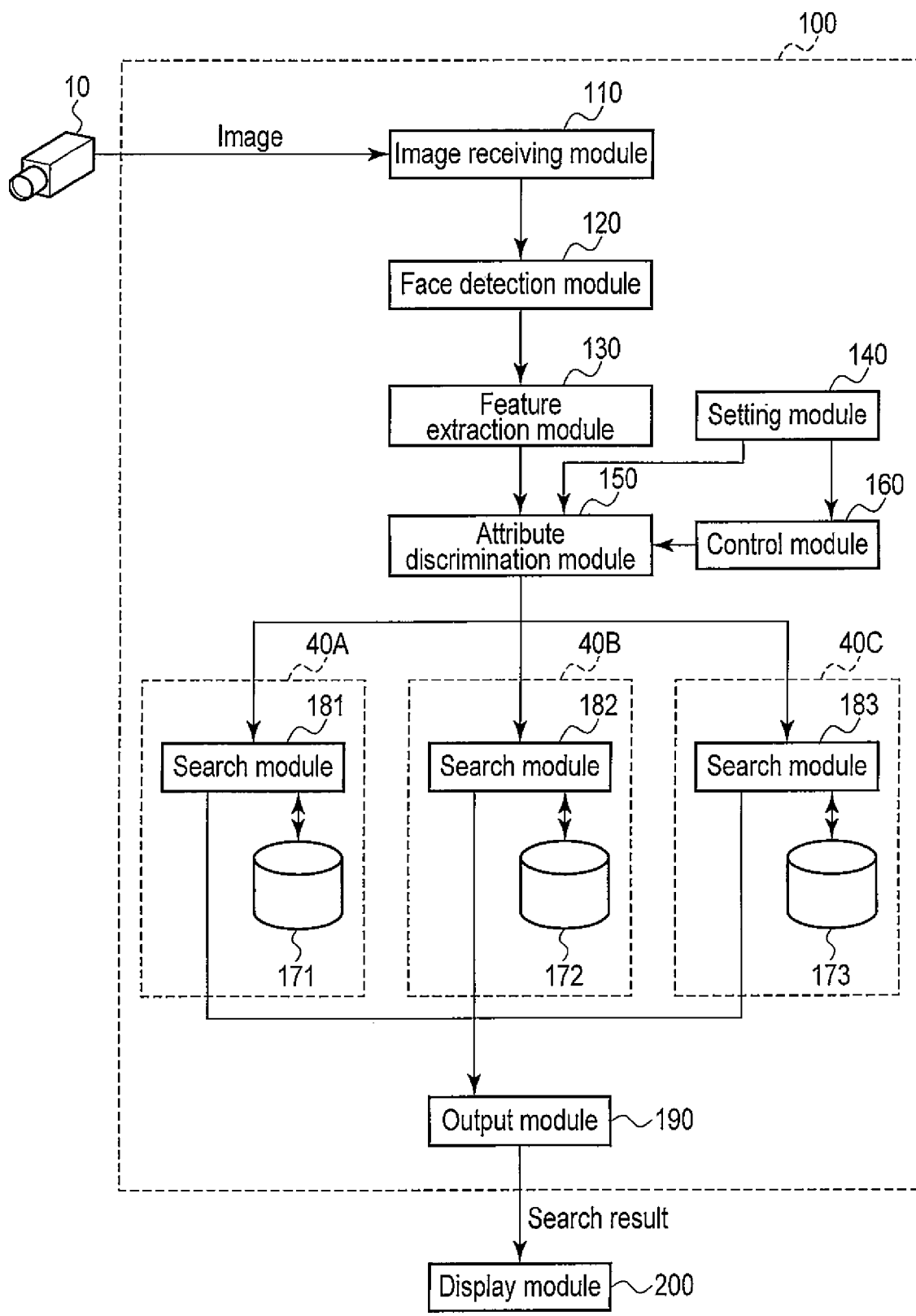
F I G. 2

| Sorting processing | Camera | Date Day of week | Time | Attribute type | Transmission destination server | | |
|---|---|---|---|---|---|---|---|
| | | | | | Class 1(male) | | Class 2... |
| | | | | | Server | Threshold | Server 2 |
| ○ Do not sort ● Sort (manual) ○ Sort (auto) | Select camera | ○ Date ● Day of week ○ Every day | ● 06:00-10:00 ○ 10:00-12:00 ○ 12:00-18:00 ○ 18:00-21:00 ○ 21:00-00:00 ○ All day | ○ Age(three classes) ○ Age(seven classes) ● Sex(three classes) ○ Glasses(two classes) ○ Hat(two classes) ○ Mask(two classes) | Server 1 | 0.6 | Server 2 |

Settings  Cancel

F I G. 3

| Camera | Date/day of week | Time | Sorting processing | Attribute type | Transmission destination server | | |
|---|---|---|---|---|---|---|---|
| | | | | | Class 1 | Class 2 | Class 3 |
| Camera 1 | Weekday(Monday to Friday) | 06:00–10:00 | Sort(manual) | Mask(two classes) | Server 1 | Server 1 | Server 1 |
| | Weekday(Monday to Friday) | 10:00–21:00 | Sort(manual) | Sex(two classes) | Server 2 | Server 3 | Server 1 |
| | Weekday(Monday to Friday) | 21:00–06:00 | Sort(manual) | Mask(two classes) | Server 1 | Server 1 | Server 1 |
| | Weekend | 06:00–10:00 | Sort(manual) | Mask(two classes) | Server 1 | Server 1 | Server 1 |
| | Weekend | 10:00–21:00 | Sort(manual) | Sex(two classes) | Server 2 | Server 3 | Server 1 |
| | Weekend | 21:00–06:00 | Sort(manual) | Mask(two classes) | Server 1 | Server 1 | Server 1 |
| Camera 2 | Weekday(Monday to Friday) | 06:00–10:00 | Sort(auto) | — | — | — | — |
| | Weekday(Monday to Friday) | 10:00–21:00 | Sort(auto) | Sex(two classes) | Server 2 | Server 3 | Server 1 |
| | Weekday(Monday to Friday) | 21:00–06:00 | Sort(auto) | — | — | — | — |
| | Weekend | 06:00–10:00 | Sort(auto) | — | — | — | — |
| | Weekend | 10:00–21:00 | Sort(manual) | Sex(two classes) | Server 2 | Server 3 | Server 1 |
| | Weekend | 21:00–06:00 | Sort(auto) | — | — | — | — |

F I G. 4

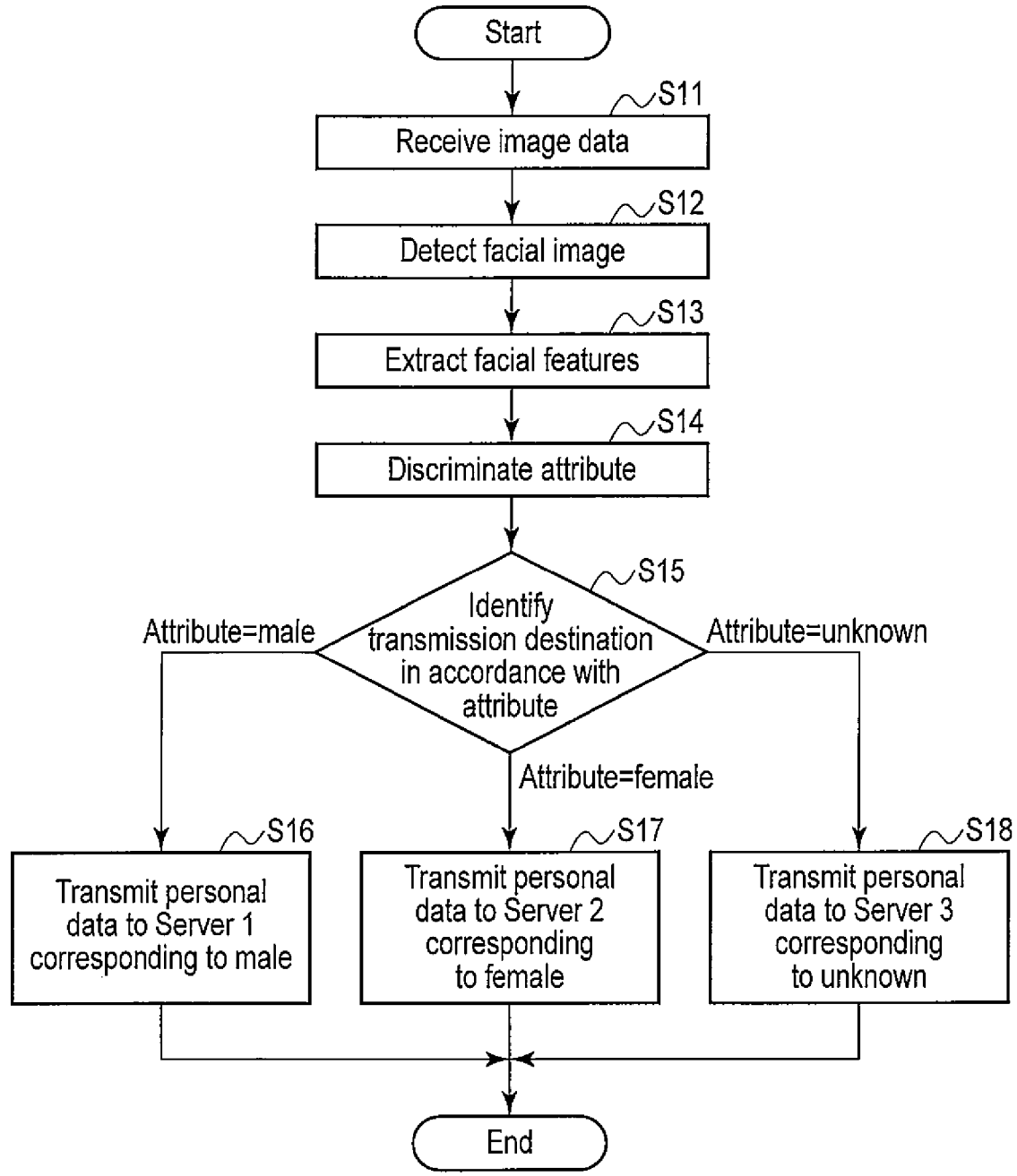
F I G. 5

| ID | Facial image | Face coordinates | Facial features | Attribute information | | | | |
|---|---|---|---|---|---|---|---|---|
| | | | | Age | Sex | Glasses | Mask | Hat |
| 0001 |  | | | Twenties | Unknown | None | White | None |
| 0002 |  | | | Thirties | Male | None | None | None |
| 0003 |  | | | Thirties | Male | Normal | None | None |
| 0004 |  | | | Teens | Male | None | None | None |
| 0005 |  | | | Seventies | Unknown | None | None | None |
FIG. 6

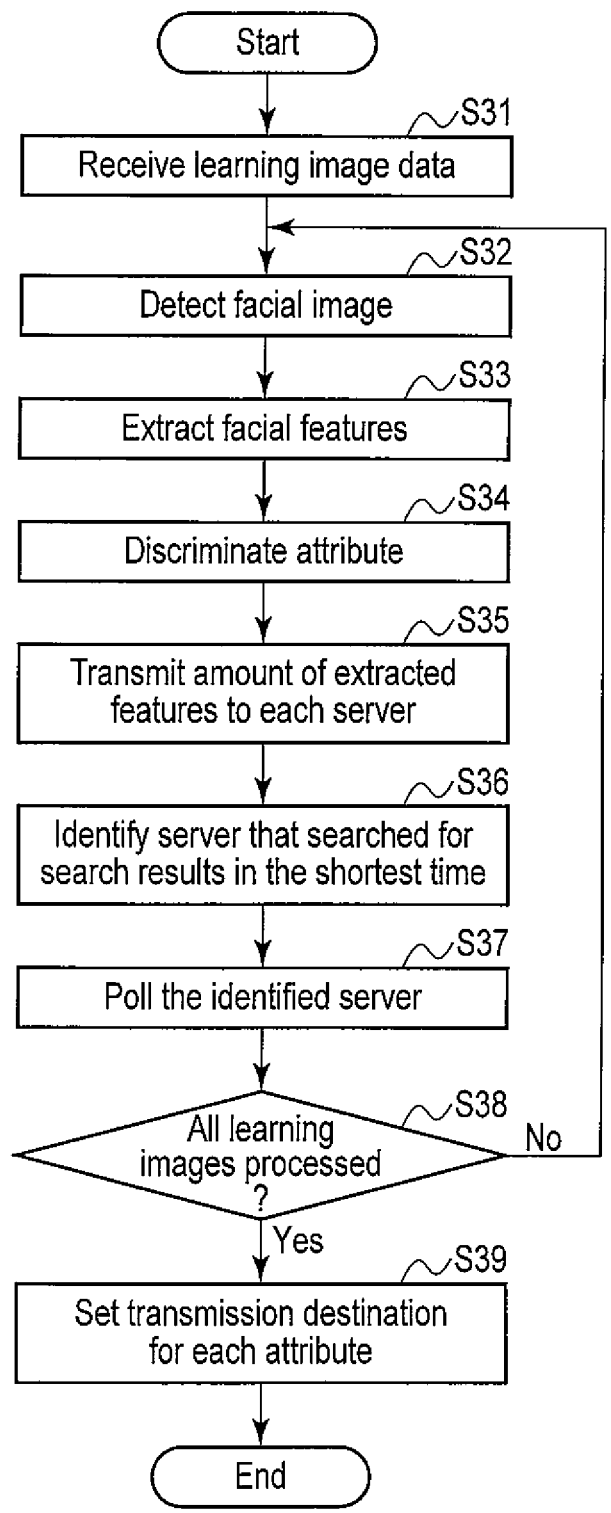
F I G. 9

| Attribute | Class | Server | Rate of poll | Selection result |
|---|---|---|---|---|
| Sex (two classes) | Class 1 (male) | Server 1 | 18.2% | |
| | | Server 2 | 80.0% | O |
| | | Server 3 | 1.8% | |
| | Class 2 (female) | Server 1 | 15.2% | |
| | | Server 2 | 4.8% | |
| | | Server 3 | 80.0% | O |
| | Class 3 (unknown) | Server 1 | 55.2% | O |
| | | Server 2 | 23.3% | O |
| | | Server 3 | 21.5% | O |
| ... | | | | |

F I G. 10

| Sorting processing | Camera | Date Day of week | Time | Attribute type | Transmission destination server | | |
|---|---|---|---|---|---|---|---|
| | | | | | Class 1(male) | | Class 2 (male-middle age) |
| | | | | | Server | Threshold | |
| ○ Do not sort<br>● Sort (manual)<br>○ Sort (auto) | Select camera | ○ Date<br>● Day of week<br>○ Every day | ● 06:00–10:00<br>○ 10:00–12:00<br>○ 12:00–18:00<br>○ 18:00–21:00<br>○ 21:00–00:00<br>○ All day | ● Age(three classes)<br>○ Age(seven classes)<br>● Sex(three classes)<br>○ Glasses(two classes)<br>○ Hat(two classes)<br>○ Mask(two classes) | Server 1 | 0.6 | Server 2 |

[ Settings ]  [ Cancel ]

F I G. 11

| Attribute 1 Sex | Attribute 2 Age | Server | Rate of poll | Selection result |
|---|---|---|---|---|
| Male | Class 1 (youth) | Server 1 | 18.2% | |
| | | Server 2 | 80.0% | O |
| | | Server 3 | 1.8% | |
| | Class 2 (youth to middle age) | Server 1 | 15.2% | |
| | | Server 2 | 4.8% | |
| | | Server 3 | 80.0% | O |
| | Class 3 (middle age) | Server 1 | 15.2% | |
| | | Server 2 | 4.8% | |
| | | Server 3 | 80.0% | O |
| | Class 4 (middle age to old age) | Server 1 | 15.2% | |
| | | Server 2 | 4.8% | |
| | | Server 3 | 80.0% | O |
| | Class 5 (old age) | Server 1 | 55.2% | O |
| | | Server 2 | 23.3% | O |
| | | Server 3 | 21.5% | O |
| Female | Class 6 (youth) | Server 1 | 18.2% | |
| | | Server 2 | 80.0% | O |
| | | Server 3 | 1.8% | |
| | Class 7 (youth to middle age) | Server 1 | 15.2% | |
| | | Server 2 | 4.8% | |
| | | Server 3 | 80.0% | O |
| | Class 8 (middle age) | Server 1 | 15.2% | |
| | | Server 2 | 4.8% | |
| | | Server 3 | 80.0% | O |
| | Class 9 (middle age to old age) | Server 1 | 15.2% | |
| | | Server 2 | 4.8% | |
| | | Server 3 | 80.0% | O |
| | Class 10 (old age) | Server 1 | 55.2% | O |
| | | Server 2 | 23.3% | O |
| | | Server 3 | 21.5% | O |
| Unknown | Class 11 (youth) | Server 1 | 48.2% | O |
| | | Server 2 | 50.0% | O |
| | | Server 3 | 1.8% | |
| | Class 12 (youth to middle age) | Server 1 | 35.2% | |
| | | Server 2 | 4.8% | |
| | | Server 3 | 60.0% | O |
| | Class 13 (middle age) | Server 1 | 35.2% | |
| | | Server 2 | 4.8% | |
| | | Server 3 | 60.0% | O |
| | Class 14 (middle age to old age) | Server 1 | 25.2% | |
| | | Server 2 | 4.8% | |
| | | Server 3 | 70.0% | O |
| | Class 15 (old age) | Server 1 | 55.2% | O |
| | | Server 2 | 23.3% | |
| | | Server 3 | 21.5% | |

F I G. 12

FACIAL IMAGE SEARCH SYSTEM AND FACIAL IMAGE SEARCH METHOD

CROSS-REFERENCE TO RELATED APPLICATIONS

This application is based upon and claims the benefit of priority from prior Japanese Patent Application No. 2011-126734, filed Jun. 6, 2011, the entire contents of which are incorporated herein by reference.

FIELD

Embodiments described herein relate generally to a facial image search system and a facial image search method.

BACKGROUND

A facial image search system that detects a facial image from images acquired by a plurality of cameras installed at a plurality of locations and searches a database for the facial image is known. The facial image search system also detects a facial image from images acquired by a camera or images stored in a recording apparatus and stores the facial image in a database.

When a facial image is searched for, the processing time needed for the search increases in accordance with the amount of information of a database. Thus, a problem that it may take time before a search result is extracted is posed.

For example, text may be added to images in a database to narrow down search targets based on the added text, but search processing may not be able to keep up if a plurality of search requests of facial images is received at the same time.

Processing loads may be distributed by distributing and storing images in a plurality of databases, but the database to be searched may not be identifiable.

BRIEF DESCRIPTION OF THE DRAWINGS

FIG. 1 is an exemplary view showing for explaining a facial image search system according to an embodiment;

FIG. 2 is an exemplary view showing for explaining the facial image search system according to the embodiment;

FIG. 3 is an exemplary view showing for explaining the facial image search system according to the embodiment;

FIG. 4 is an exemplary view showing for explaining the facial image search system according to the embodiment;

FIG. 5 is an exemplary view showing for explaining the facial image search system according to the embodiment;

FIG. 6 is an exemplary view showing for explaining the facial image search system according to the embodiment;

FIG. 9 is an exemplary view showing for explaining the facial image search system according to the embodiment;

FIG. 10 is an exemplary view showing for explaining the facial image search system according to the embodiment;

FIG. 11 is an exemplary view showing for explaining the facial image search system according to the embodiment; and FIG. 12 is an exemplary view showing for explaining the facial image search system according to the embodiment.

DETAILED DESCRIPTION

Figure 7:
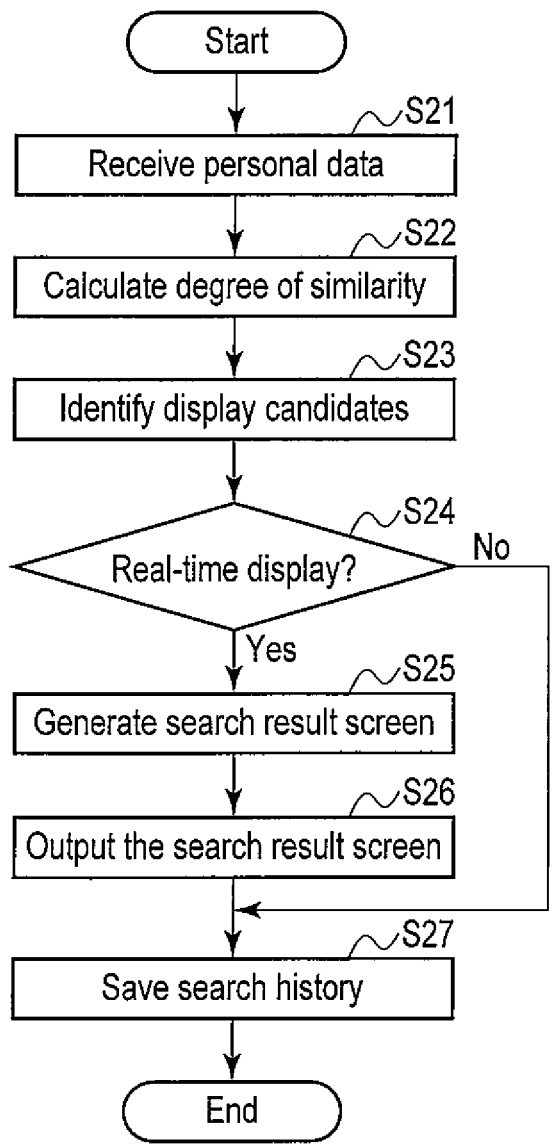
FIG. 7 is an exemplary view showing for explaining the facial image search system according to the embodiment.

In general, according to one embodiment, a facial image search system, comprises, an image receiving module configured to receive image data, a face detection module configured to detect a facial image from the image data received by the image receiving module, a feature extraction module configured to extract a facial feature from the facial image detected by the face detection module, an attribute discrimination module configured to discriminate an attribute based on the facial feature extracted by the feature extraction module, a plurality of search modules configured to store the facial feature as a database in advance, add the facial feature extracted by the feature extraction module to the database when received, calculate a degree of similarity between the facial feature extracted by the feature extraction module and the facial feature contained in the database, and output a search result based on the calculated degree of similarity, a setting module configured to generate setting information by associating with any attribute with information indicating the search module, and a control module configured to identify one or a plurality of search modules based on the setting information generated by the setting module and the attribute discriminated by the attribute discrimination module and transmit the facial feature extracted by the feature extraction module to the identified search modules.

A facial image search system and a facial image search method according to an embodiment will be described below with reference to drawings.

FIG. 1 shows an example of a facial image search system 100 according to an embodiment.

The facial image search system 100 includes a camera 10 that acquires an image, a face detection client 20, a feature extraction server 30, and a search server 40. In FIG. 1, an example in which the facial image search system 100 includes a plurality of cameras 10A to 10N, a plurality of face detection clients 20A to 20N, a plurality of feature extraction servers 30A to 30N, and a plurality of search servers 40A to 40N is shown.

The camera 10, the face detection client 20, the feature extraction server 30, and the search server 40 are mutually connected by a LAN, public line, or another network capable of performing data communication. Accordingly, the camera 10, the face detection client 20, the feature extraction server 30, and the search server 40 can mutually perform data communication.

The camera 10 receives light from a predetermined range to acquire an image. For example, the cameras 10A to 10N are installed in mutually different locations. Accordingly, the camera 10 can acquire an image of persons present in each location. The camera 10 includes, for example, an industrial television (ITV) camera. The ITV camera generates an electric signal based on light received by a lens and digitizes the electric signal by an analog/digital (A/D) converter for output as image data. Accordingly, the camera 10 can output image data to the face detection client 20.

The face detection client 20 detects a facial image (facial image data) based on image data output from the camera 10. The method of detecting a facial image will be described later. The face detection client 20 outputs the detected facial image data to the feature extraction server 30.

The feature extraction server 30 extracts facial features of persons based on facial image data output from the face detection client 20. Further, the feature extraction server 30 discriminates attributes of persons based facial image data or facial features. The feature extraction server 30 identifies at least one search server 40 to which facial image data, facial features, attribute information indicating attributes and the like should be transmitted based on the discriminated attributes. The feature extraction server 30 outputs facial image data, facial features, and attribute information to the identified search server 40.

The search server 40 stores facial image data, facial features, and attribute information output from the feature extraction server 30. The search server 40 sets facial image data, facial features, and attribute information as one piece of personal data to construct a database containing a plurality of pieces of personal data. Further, the search server 40 performs a personal search by calculating a degree of similarity between facial features registered with a database and facial features output from the feature extraction server 30. The search server 40 can signal past access of a specific person to the administrator of the facial image search system 100 by displaying, for example, a search result in a display apparatus.

Accordingly, the facial image search system 100 can identify personal data in the database by using a facial image. As a result, the facial image search system 100 can realize, for example, a search for a specific person from customer data or a search for an appropriate person from a database of suspicious persons. The facial image search system 100 can also be used for personal identification when an ID certificate is updated or prevention of double issuance when an ID certificate is newly issued.

FIG. 2 shows a concrete example of the facial image search system 100 according to an embodiment. FIG. 2 shows each function of the facial image search system 100, for example, as a block.

As shown in FIG. 2, the facial image search system 100 includes an image receiving module 110, a face detection module 120, a feature extraction module 130, a setting module 140, an attribute discrimination module 150, a control module 160, personal data storage modules 171 to 173, search modules 181 to 183, and an output module 190.

The image receiving module 110, the face detection module 120, the feature extraction module 130, the setting module 140, the attribute discrimination module 150, and the control module 160 may be included in the face detection client 20 or the feature extraction server 30. A still another module connected to the network shown in FIG. 1 may be configured to include the above functional blocks. The facial image search system 100 may be configured to include a plurality of blocks of each of the above blocks. That is, the number of each block of the facial image search system 100 can optionally be increased in accordance with numbers of inputs/outputs of the facial image search system 100.

The image receiving module 110 receives image data from the camera 10. The image receiving module 110 transmits the received image data to the face detection module 120. The image receiving module 110 may also be configured to receive image data recorded in a storage apparatus that records video such as a digital video recorder (DVR) or a memory, instead of the camera 10. Further, the image receiving module 110 may also be configured to receive an analog video signal (image), make an analog/digital conversion of the received analog video signal, and transmit the converted digital image data to the face detection module 120.

The face detection module 120 detects an image (facial image) of a region (face region) in which any face of a person appears based on image data transmitted from the image receiving module 110. The face detection module 120 transmits the detected facial image to the feature extraction module 130.

For example, the face detection module 120 calculates a correlation value while moving a template prepared in advance in image data. The face detection module 120 identifies the region where the highest correlation value is calculated as a face region. Accordingly, the face detection module 120 can detect a facial image of a face region where the face of a person appears in image data.

The face detection module 120 may also be configured to detect a face region by using eigen space method or subspace method. The face detection module 120 may also be configured to detect a face region by detecting positions of face portions such as the eyes and nose from image data.

When one face region (facial feature) is detected from one image, the face detection module 120 outputs the position where the correlation value with a template is the largest for the whole image and the size thereof. When a plurality of facial features is detected from one image, the face detection module 120 determines local maximum values of the correlation value for the whole image and narrows down candidate positions of the face by considering overlapping within one image. Further, the face detection module 120 can detect a plurality of facial images simultaneously in the end by considering the relationship (time shift) with past images input successively.

In addition, the face detection module 120 may be configured to store face patterns when a person puts on a mask, sun glasses, a hat or the like as templates in advance so that a face region can be detected even when the person puts on a mask, sun glasses, a hat or the like.

If all feature points of a face cannot be detected when detecting feature points of the face, the face detection module 120 performs processing based on the evaluation point of a portion of facial feature points. That is, if the evaluation point of a portion of facial feature points is equal to or larger than a preset standard value, the face detection module 120 can estimate remaining feature points from feature points detected by using a two-dimensional plane or a three-dimensional face model.

If no feature point is detected, the face detection module 120 detects the position of a whole face by learning patterns of the whole face in advance to estimate facial feature points from the position of the whole face.

If the camera 10 is a surveillance camera, the same person is likely to appear in successive frames. Thus, the face detection module 120 calculates the probabilities of movement in successive frames when a person normally walks based on statistical information and selects a combination of the highest probability so that face regions detected successively can be associated. Accordingly, the face detection module 120 can detect one face region from a scene in which the same person appears in a plurality of frames.

If the frame rate of the camera 10 is high, the face detection module 120 can detect one face region from a scene in which the same person appears in a plurality of frames by associating face regions between frames by using an optical flow or the like.

The face detection module 120 may also be configured to detect, for example, a whole body of a person. The face detection module 120 determines, for example, what the distribution of luminance slope information looks like when a person is present by using coincidence in a plurality of local regions. If a person is present, the face detection module 120 calculates the region where the person appears as rectangular information. Based on the detection result, the face detection module 120 estimates the face region where the face of the person appears to detect a facial image. Based on the rectangular information, the face detection module 120 may also be configured to measure the height of a person.

Based on the facial image transmitted from the face detection module 120, the feature extraction module 130 extracts facial features. Facial features are feature information to identify individuals. The feature extraction module 130 can calculate facial features by using, for example, the subspace method. The feature extraction module 130 transmits extracted facial features to the attribute discrimination module 150.

The feature extraction module 130 extracts, for example, a grayscale information of a facial image as facial features. The feature extraction module 130 extracts grayscale values of a region of m pixels×n pixels as a (m×n)-dimensional feature vector. That is, the feature extraction module 130 normalizes the length of each of a vector and another vector to 1 by using the technique called the simple similarity degree method and calculates an inner product of the vectors. Accordingly, the feature extraction module 130 can calculates the degree of similarity indicating similarities between feature vectors.

The feature extraction module 130 can also create images in which the orientation and state of a face are intentionally varied by using a model preset for a facial image to extract facial features based on the above images.

Further, as described above, the feature extraction module 130 can extract facial features with higher precision based on a plurality of facial images captured successively by the camera 10. In this case, the feature extraction module 130 can extract facial features by using, for example, mutual subspace method. That is, the feature extraction module 130 calculates a correlation matrix of a feature vector of a facial image and determines an eigen vector by the KL expansion of the calculated matrix. Accordingly, the feature extraction module 130 calculates a subspace indicating features of a face obtained from successive images.

The subspace can be represented by a set of k eigen vectors selected in descending order of magnitude of the eigen value. In the present embodiment, an eigen value matrix $\Phi$ is calculated by calculating a correlation matrix Cd from a feature vector and diagonalizing the correlation matrix Cd like $Cd = \Phi d \times \Delta d \times \Phi d \times T$.

The setting module 140 sets the search server as a transmission destination to which personal data including attributes discriminated by the attribute discrimination module 150, image data, and facial features is transmitted. The setting module 140 has an operation module that generates an operation signal based operation input by an operator and a display module that displays a setting screen and the like connected thereto. When settings should be made, the setting module 140 generates a setting screen to cause the display module to display the setting screen. FIG. 3 shows an example of the setting screen generated by the setting module 140.

The setting screen includes items such as "Sorting Processing", "Camera", "Date and Day of Week", "Time", "Attribute Type", and "Transmission Destination Server". The facial image search system 100 performs sorting processing that sorts personal data among a plurality of search servers based on the above settings and a result of attribute discrimination by the attribute discrimination module 150 described later. That is, the facial image search system 100 identifies the search server as a transmission destination to which image data, facial features, and attributes are transmitted based on the above settings and a result of attribute discrimination by the attribute discrimination module 150 described later.

"Sorting Processing" is an item to set whether the sorting processing is performed. If "Do not sort" is selected, the facial image search system 100 transmits personal data to all the search servers 40 in the facial image search system 100. If "Sort (Manual)" is selected, personal data is transmitted to the search server 40 corresponding to settings of the items such as "Camera", "Date and Day of Week", "Time", "Attribute Type", and "Transmission Destination Server" and attributes discriminated by the attribute discrimination module 150. The operation when "Sort (Auto)" is selected will be described later.

"Camera" is an item to select the camera 10 to be set. That is, setting items shown in FIG. 3 may have, for example, a configuration set for each of the cameras 10 shown in FIG. 1. Alternatively, setting items may have a configuration set to all the cameras 10 shown in FIG. 1 in common.

"Date and Day of Week" is an item to set the date and/or the day of week on which the sorting processing is performed. In "Date and Day of Week", for example, dates, a range of dates, days of week, or a range of days of week (for example, weekdays and weekends) is set.

The item "Time" is an item to set the time when the sorting processing is performed. In "Time", for example, a range of time is set. If whether to perform sorting processing is not limited based on the time, All Day is set as "Time".

"Attribute Type" is an item to select the type of attributes to be sorted. As shown in FIG. 3, "Attribute Type" includes items such as "Age (three classes)", "Age (seven classes)", "Sex (three classes)", "Glasses (two classes)", "Hat (two classes)", and "Mask (two classes)". "Attribute Type" may be configured to set still other attributes.

"Age (three classes)" includes classes such as youth, middle age, and old age. "Age (seven classes)" includes classes such as teens, twenties, thirties, forties, fifties, sixties, and seventies. "Sex (three classes)" includes classes such as male, female, and unknown.

"Glasses (two classes)" include classes such as bespectacled and non-bespectacled. "Hat (two classes)" includes classes such as with a hat and without a hat. "Mask (two classes)" includes classes such as with a mask and without a mask.

"Transmission Destination Server" is an item to set the search server 40 as a transmission destination of personal data for each class of attributes set by "Attribute Type". The facial image search system 100 identifies the above class based on attributes discriminated by the attribute discrimination module 150 and identifies the search server 40 as a transmission destination of personal data based on the identified class. The facial image search system 100 transmits personal data to the identified search server 40.

The item of "Transmission Destination Server" may be configured to set a plurality of the search servers 40 as transmission destinations. The item of "Transmission Destination Server" may also be configured to set a class of the search server 40 to which personal data is not transmitted. Further, the item of "Transmission Destination Server" may also be configured to set a threshold for each class or each of the search servers 40 as transmission destinations. In this case, the facial image search system 100 transmits the threshold to the search server 40 by associating with personal data.

By setting each of the above items, setting information as shown in FIG. 4 is generated. If "Sort (Auto)" is selected in the item of "Sorting Processing", the transmission destination is selected based on setting information generated by automatic setting processing described later and thus, the items of "Attribute Type" are "Transmission Destination Server" are blank.

If, for example, "Sex (three classes)" is selected as "Attribute Type", the setting module 140 sets "male" as Class 1, "female" as Class 2, and "unknown" as Class 3. Further, the setting module 140 sets the search server 40 as a transmission destination for each class. For example, the search module 140 sets "Server 1" as Class 1, "Server 2" as Class 2, and "Server 1" and "Server 2" as Class 3.

In this case, the facial image search system 100 transmits personal data discriminated by the attribute discrimination module 150 as "male" to Server 1. The facial image search system 100 transmits personal data discriminated by the attribute discrimination module 150 as "female" to Server 2. Further, the facial image search system 100 transmits personal data discriminated by the attribute discrimination module 150 as "unknown" to both Server 1 and Server 2.

That is, by transmitting personal data with low reliability such as with unknown sex to a plurality of servers, personal data to be searched can be prevented from being excluded from search targets.

In the above example, the age, sex, presence/absence of glasses, presence/absence of a mask, and presence/absence of a hat are shown as "Attribute Type", but the attribute types are not limited to the above examples. The setting module 140 may be configured to set the transmission destination based on still other attribute types.

The attribute discrimination module 150 discriminates attributes based on facial features transmitted from the feature extraction module 130 or facial features transmitted from the face detection module 120. The attribute discrimination module 150 associates and sets discriminated attributes, facial features, and facial images as personal data. The attribute discrimination module 150 transmits personal data to the search server 40 based on control of the control module 160.

In the present embodiment, an example in which the attribute discrimination module 150 discriminates the age, sex, presence/absence of glasses, presence/absence of a mask, and presence/absence of a hat as attributes is shown. However, the attribute discrimination module 150 may be configured to distinguish still other attributes. Examples of other attributes include, for example, clothes, facial expressions, obesity index, degree of affluence, ornaments on the face, and human race.

If, for example, attributes such as the age and sex are discriminated, the attribute discrimination module 150 can discriminate attributes with high precision by performing preprocessing appropriate for each of the age and sex.

Normally, a person's face becomes more wrinkled with advancing age. Thus, the attribute discrimination module 150 can discriminate the age of person by, for example, superimposing a line highlighting filter highlighting wrinkles on facial features.

The attribute discrimination module 150 also superimposes a filter that highlights frequency components highlighting sex-specific portions (for example, whiskers) or a filter that highlights skeleton information on facial features. Accordingly, the attribute discrimination module 150 can discriminate the sex of a person.

If, for example, the sex is discriminated, the attribute discrimination module 150 calculates one value indicating the degree of sex as a discrimination result. The attribute discrimination module 150 discriminates between male and female based on the value and a preset standard value. However, if a value close to the standard value is calculated, the attribute discrimination module 150 makes no discrimination between male and female.

The above standard value may be configured to be set by an operation module connected to the setting module 140. Alternatively, the above standard value may be configured to be set based on a learning process executed by the facial image search system 100. In this case, the setting module 140 performs face detection, feature extraction, and attribute discrimination based on image data to which the attribute indicating "male" or "female" is attached in advance and sets the standard value based on the result of attribute discrimination and attributes attached in advance.

The attribute discrimination module 150 identifies the position of the eye, corner of the eye, or eye's inner corner from position information of face portions determined by, for example, face detection processing. Accordingly, the attribute discrimination module 150 can determine whether a person is bespectacled by cutting out an image near both eyes and setting the cut-out image for calculation of subspace.

The attribute discrimination module 150 also identifies the positions of the mouth and nose from position information of face portions determined by, for example, face detection processing. Accordingly, the attribute discrimination module 150 can determine whether a person wears a mask by cutting out an image in positions of the identified mouth and nose and setting the cut-out image for calculation of subspace.

The attribute discrimination module 150 also identifies the positions of the eye and brow from position information of face portions determined by, for example, face detection processing. Accordingly, the attribute discrimination module 150 can identify the upper end of a skin region of face. Further, the attribute discrimination module 150 can determine whether a person wears a hat by cutting out an image of a head region of the identified face and setting the cut-out image for calculation of subspace.

As described above, the attribute discrimination module 150 can discriminate attributes such as the age, sex, presence/absence of glasses, presence/absence of a mask, and presence/absence of a hat based on facial features or a facial image. That is, the attribute discrimination module 150 can extract feature information of any attribute present in a position that can be estimated from the position of a face.

Moreover, algorithms that directly detect worn matter worn by a person are generally in practical use. The attribute discrimination module 150 may be configured to discriminate attributes by using such techniques. For example, the attribute discrimination module 150 may be configured to further distinguish attributes such as the type of glasses, type of mask, type of hat, whiskers, moles, wrinkles, injury, hairstyle, color of hair, color of clothes, style of clothes, hat, ornaments, worn matter close to the face, facial expressions, degree of affluence, and human race.

The control module 160 identifies the search server 40 as a transmission destination of personal data based on attributes discriminated by the attribute discrimination module 150 and transmission destinations for each class set by the setting module 140. The control module 160 controls the attribute discrimination module 150 so that personal data is transmitted to the identified search server 40.

That is, the control module 160 references setting information set by the setting module 140 and identifies the class set by the setting module 140 based on attributes discriminated by the attribute discrimination module 150. The control module 160 identifies the search server 40 as a transmission destination set to the identified class and controls the attribute discrimination module 150 so that personal data is transmitted to the identified search server 40. If, as described above, the threshold is set to the transmission destination server, the control module 160 adds the threshold to the personal data.

FIG. 5 shows an example of sorting processing performed by the facial image search system 100.

The image receiving module 110 receives image data from the camera 10 (step S11). The image receiving module 110 transmits the received image data to the face detection module 120.

The face detection module 120 detects a face (facial image) based on image data transmitted from the image receiving module 110 (step S12). The face detection module 120 transmits the detected facial image to the feature extraction module 130.

Based on the facial image transmitted from the face detection module 120, the feature extraction module 130 extracts facial features (step S13). The feature extraction module 130 transmits extracted facial features to the attribute discrimination module 150.

The attribute discrimination module 150 discriminates attributes based on facial features transmitted from the feature extraction module 130 (step S14).

The control module 160 identifies the search server 40 as a transmission destination of personal data based on attributes discriminated by the attribute discrimination module 150 and transmission destinations for each class set by the setting module 140 (step S15). The control module 160 controls the attribute discrimination module 150 so that personal data is transmitted to the identified search server 40.

Assume, for example, that "male" is set as Class 1, "female" as Class 2, and "unknown" as Class 3 in setting information of the setting module 140. Assume further that "Server 1" is set as the transmission destination of Class 1, "Server 2" as the transmission destination of Class 2, and "Server 1" and "Server 2" as the transmission destinations of Class 3 in the setting information of the setting module 140.

The control module 160 identifies that the transmission destination of personal data discriminated as "male" by the attribute discrimination module 150 is "Server 1" (step S16). The control module 160 also identifies that the transmission destination of personal data discriminated as "female" by the attribute discrimination module 150 is "Server 2" (step S17). Further, the control module 160 identifies that the transmission destinations of personal data discriminated as "unknown" by the attribute discrimination module 150 are "Server 1" and "Server 2" (step S18). The attribute discrimination module 150 transmits personal data to the transmission destination identified by the control module 160.

The personal data storage modules 171 to 173 and the search modules 181 to 183 are included in, for example, the search server 40 shown in FIG. 1. However, the personal data storage modules 171 to 173 or the search modules 181 to 183 may be modules configured separately. The personal data storage modules 171 to 173 and the search modules 181 to 183 are installed in the facial image search system 100 in accordance with the number of classes sorted by the sorting processing. That is, the numbers of the personal data storage modules 171 to 173 and the search modules 181 to 183 of the facial image search system 100 are optionally increased in accordance with the number of servers that sort by the sorting processing.

In the present embodiment, it is assumed that a search server 40A includes the personal data storage module 171 and the search module 181, a search server 40B includes the personal data storage module 172 and the search module 182, and a search server 40C includes the personal data storage module 173 and the search module 183. The personal data storage modules 171 to 173 perform the same operation and so an example of the personal data storage module 171 will be described. Also, the search modules 181 to 183 perform the same operation and so an example of the search module 181 will be described.

The personal data storage module 171 is a memory that stores personal data transmitted from the attribute discrimination module 150. As shown, for example, in FIG. 6, the personal data storage module 171 stores a plurality of pieces of personal data as a database.

The personal data storage module 171 stores each individual by associating with, for example, ID, facial features, facial images, face coordinates, and attributes. Further, if the threshold is added to personal data, the personal data storage module 171 stores the threshold by associating with the personal data.

As described above, attributes include, for example, the sex, age, height, presence/absence of a hat, presence/absence of a mask, presence/absence of glasses and the like. Facial features stored in the personal data storage module 171 are data extracted by, for example, the feature extraction module 130. That is, the personal data storage module 171 stores one or a plurality of an (m×n)-dimensional feature vector, subspace, and correlation matrix immediately before KL expansion.

In the present embodiment, an example in which the personal data storage module 171 and the search module 181 are in a one-to-one correspondence is shown. However, the facial image search system 100 may have a configuration in which the personal data storage module 171 and the search modules 181 are in a one-to-many correspondence. Alternatively, the facial image search system 100 may have a configuration in which the personal data storage modules 171 and the search module 181 are in a many-to-one correspondence. The personal data storage module 171 may be configured to classify and store information by attribute.

The search module 181 calculates the degree of similarity between facial features contained in personal data transmitted from the attribute discrimination module 150 and facial features contained in personal data stored in the personal data storage module 171. For example, the search module 181 calculates the degree of similarity based on facial features contained in personal data transmitted from the attribute discrimination module 150 and a plurality of pieces of personal data stored in the personal data storage module 171 and searches the personal data storage module 171 for personal data with a high calculated degree of similarity.

For example, the search module 181 searches the personal data storage module 171 for personal data for which a higher degree of similarity is calculated than a threshold associated with personal data stored in the personal data storage module 171. The search module 181 also searches the personal data storage module 171 for as many pieces of personal data as a preset number in descending order of calculated degree of similarity. The search module 181 can also narrow down search targets based on attributes contained in each piece of personal data of the personal data storage module 171.

The search module 181 calculates, for example, the degree of similarity of subspace as a facial feature. As the calculation method thereof, the subspace method, combined similarity degree method or the like may be used. By using the method, the search module 181 calculates an "angle" formed by subspace of personal data in a database stored in advance with subspace calculated by the feature extraction module 130 as the degree of similarity. The search module 181 calculates a correlation matrix Cin for an input data sequence. The search module 181 calculates an eigen vector $\Phi$in by diagonalization like Cin=$\Phi$in$\Delta$in$\Phi$inT. The search module 181 calculates the degree of similarity between subspaces (0.0 to 1.0) of subspaces denoted by in and $\Phi$d uses the degree of similarity between subspaces as the degree of similarity.

The output module 190 outputs a search result screen generated by the search module 181 to the search module 183 to a display module 200. The output module 190 may be provided for each of the server 40A to the server 40C.

The display module 200 includes a display apparatus that displays a screen of video or the like. The display module 200 is connected to the network shown in FIG. 1 and receives and displays a screen output from the output module 190. The number of the display modules 200 may be more than one. In such a case, the output module 190 outputs a search result screen output from the server 40A to the server 40C to the desired display module 200.

FIG. 7 shows an example of search processing performed by the facial image search system 100.

The search module 181 of the search server 40 receives personal data from the feature extraction server 30 or the like (step S21).

The search module 181 calculates the degree of similarity between facial features of received personal data and facial features contained in personal data stored in the personal data storage module 171 (step S22).

Further, the search module 181 identifies display candidates based on the calculated degree of similarity (step S23). That is, the search module 181 identifies top N calculated degrees of similarity or degrees of similarity exceeding a threshold. Further, the search module 181 identifies personal data used for calculating the identified degrees of similarity as display candidates. The search module 181 outputs the identified display candidates to the output module 190 as a search result. The search module 181 may be configured to generate a search result screen based on the identified display candidates and output the search result screen to the output module 190.

Further, the search module 181 holds a flag indicating whether to make a "real-time display". When display candidates are identified, the search module 181 determines whether the real-time display is ON (step S24).

If the real-time display is ON, the search module 181 sequentially generates a search result screen based on a search result (step S25). Based on a search result, the search module 181 generates a search result screen shown, for example, in FIG. 8.

Figure 8:
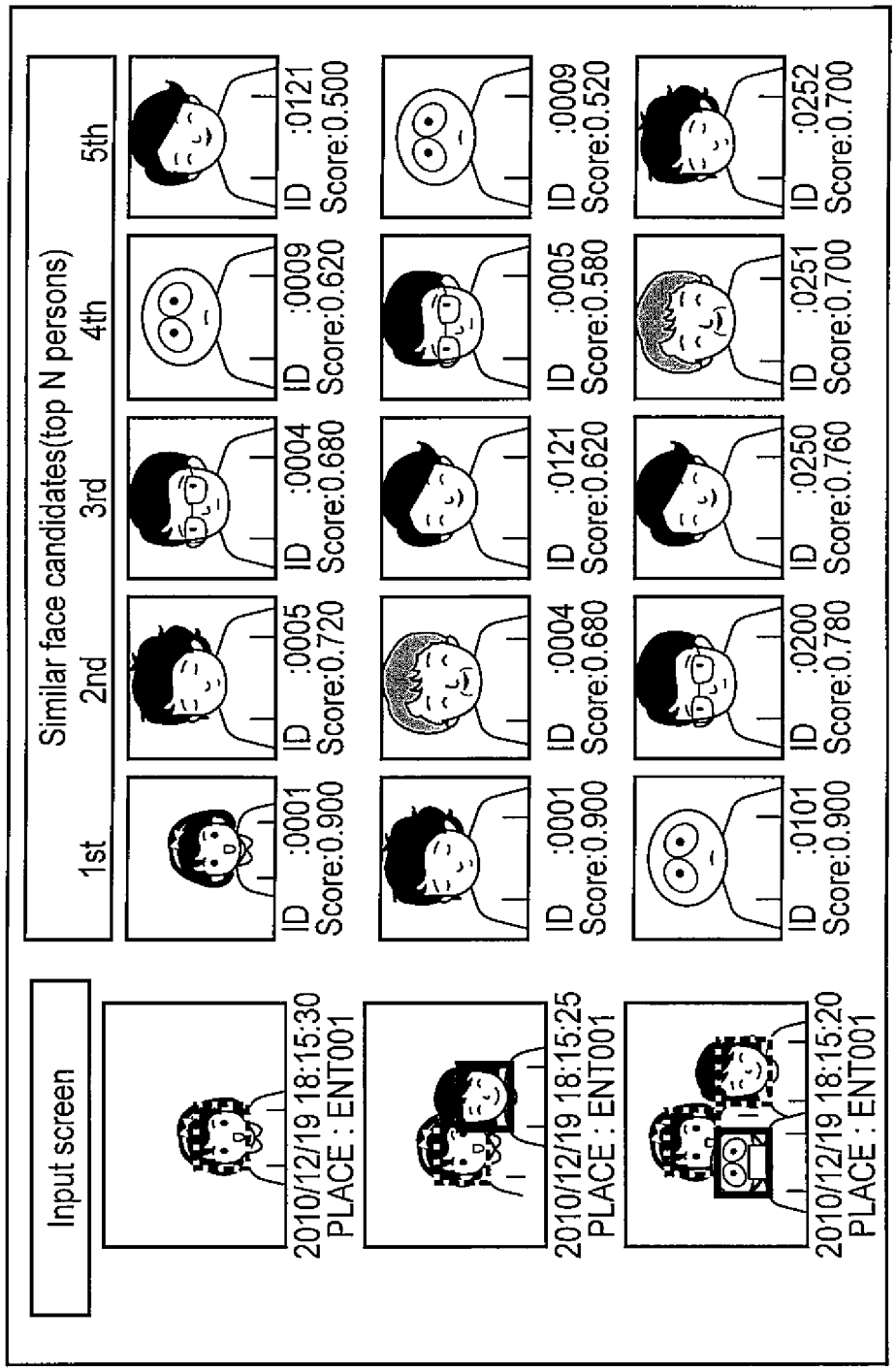
FIG. 8 is an exemplary view showing for explaining the facial image search system according to the embodiment.

As shown in FIG. 8, the search result screen displays input images (image data) and images of similar face candidates. Similar face candidates are, for example, the same as display candidates identified by the above processing or a portion of display candidates. The search module 181 displays images of similar face candidates, for example, in descending order of calculated degree of similarity. The search module 181 displays facial images detected by the face detection module 120 or facial features extracted by the feature extraction module 130 as images of similar face candidates. The search module 181 may display the calculated degree of similarity, ID and the like near images of similar face candidates. The search module 181 may also display the photographing location and date/time near input images.

The search module 181 may also display a region in which a facial image is detected by the face detection module 120 by enclosing the region with a rectangular frame. Accordingly, the search module 181 can signal a search target to the administrator of the facial image search system 100. If, for example, an operation to select the face of another person in an input image is performed for the search module 181, the search module 181 displays similar face candidates by setting the selected person as a search target.

The number of similar face candidates displayed in the search result screen can be set to any number. The search module 181 may also be configured to display images of still other similar face candidates based on a scroll operation. Further, the search module 181 may be configured to signal to the administrator of the facial image search system 100 by using sound of alarm or the like when the degree of similarity equal to or larger than a preset threshold is calculated.

The search module 181 transmits the generated search result screen to the output module 190. In this case, the output module 190 outputs the search result screen received from the search module 181 to the display module 200 (step S26). Accordingly, the facial image search system 100 can sequentially signal a search result to the administrator of the facial image search system 100. Further, the search module 181 sequentially stores a search result as a history (search history) (step S27).

The search module 181 may be configured to generate a search result screen if a search result corresponding to preset conditions is obtained when the real-time display is ON.

The search module 181 may also be configured to store a search result as a history (search history) and generate a search result screen based on a search result corresponding to newly set conditions. For example, the search module 181 is set to generate a search result screen when the real-time display is ON and top degrees of similarity of search results are equal to or more than a threshold.

Accordingly, when image data of a person registered with the personal data storage module 171 is input into the facial image search system 100, a search result screen can be output.

The search module 181 can narrow down a search history based on the photographing location of image data, date/time thereof, and attributes by storing the search history by associating with the above attribute information, ID of the camera that acquired images of personal data, and acquisition date/time of images.

As described above, the facial image search system 100 according to the present embodiment includes a plurality of databases having personal data and a plurality of search modules that performs a search of the databases. The facial image search system 100 detects a facial image or facial features from image data, discriminates attributes of the person, and identifies the search module to which personal data is transmitted in accordance with the discriminated attributes. The facial image search system 100 transmits personal data to the identified search module to cause the search module to perform a search of a database.

With the above configuration, the facial image search system 100 can efficiently perform a search of persons based on image data acquired by the cameras 10 installed at a plurality of locations. As a result, a facial image search system capable of performing a search of facial images more efficiently and a facial image search method can be provided.

Next, the automatic setting processing of setting information of the setting module 140 will be described.

In this case, if "Sort (Auto)" of the items of "Sorting Processing" shown in FIG. 3 is selected, the setting module 140 generates setting information in such a way that personal data is transmitted to the server that performs the fastest search for each attribute. In this case, the setting module 140 generates setting information based on learning images containing a plurality of images prepared in advance.

FIG. 9 shows an example of the automatic setting processing by the setting module 140.

The image receiving module 110 receives learning image data from, for example, a memory (step S31). The image receiving module 110 transmits the received learning image data to the face detection module 120.

The face detection module 120 detects a face (facial image) based on the learning image data transmitted from the image receiving module 110 (step S32). The face detection module 120 transmits the detected facial image to the feature extraction module 130.

Based on the facial image transmitted from the face detection module 120, the feature extraction module 130 extracts facial features (step S33). The feature extraction module 130 transmits extracted facial features to the attribute discrimination module 150.

The attribute discrimination module 150 discriminates attributes based on facial features transmitted from the feature extraction module 130 (step S34).

The control module 160 controls the attribute discrimination module 150 so that personal data is transmitted to all or a plurality of the search servers 40 in the facial image search system 100 (step S35).

In this case, the search modules 181, 182, 183 of each server search respective databases for data corresponding to the received personal data. Further, the search modules 181, 182, 183 of each server return search results to the control module 160. In this case, the search modules 181, 182, 183 of each server transmit, for example, personal data for which the highest degree of similarity is calculated or personal data for which the degree of similarity equal to or more than a predetermined threshold is calculated to the control module 160 as a search result.

The control module 160 receives a search result from each of the search modules 181, 182, 183. The control module 160 determines whether a search result received from each of the search modules 181, 182, 183 is correct. Further, the control module 160 identifies, among the search modules 181, 182, 183 that have transmitted the correct search results, the search module that has transmitted the search result as the earliest search module (step S36).

The control module 160 polls the identified search module (step S37). The polling is performed by, for example, the counter provided for each class in the setting module 140. FIG. 10 shows an example of the counter. The counter counts the poll of each of the search modules 181, 182, 183 for each class. The counter is installed in one of modules in the facial image search system 100. The counter may also be configured to be connected to the network shown in FIG. 1.

Each time the poll is taken based on one piece of learning image data, the control module 160 causes the counter to count up by a predetermined number. The control module 160 performs processing from step S32 to step S37 described above until all learning image data is processed (step S38).

When all learning image data is processed, the control module 160 identifies the search module having the highest rate of poll for each class. As shown in FIG. 10, the control module 160 sets all servers as transmission destination for Class 3 whose attribute cannot be discriminated exactly. Accordingly, leakage of search can be prevented.

The control module 160 updates setting information of the setting module 140 based on the identified result. Accordingly, the control module 160 can identify the search server 40 as a transmission destination for each class (step S39).

Accordingly, the facial image search system 100 can automatically set the search server 40 capable of performing a faster search for each class of the setting module 140.

With the above configuration, the facial image search system 100 can efficiently search for suspicious persons, for example, in locations frequently visited by children. For example, the facial image search system 100 sets setting information so as to perform sorting processing based on the attribute type of age in the time accessed by children. Accordingly, for example, the facial image search system 100 does not transmit personal data whose age is judged to correspond to a child to the search server and stores personal data whose age is judged to correspond to an adult on the search server. The facial image search system 100 can thereby reduce the load of the search server and efficiently search for persons to be searched for. The facial image search system 100 may be configured to raise an alarm when a person judged to be younger than a predetermined age is detected.

In the above embodiment, the facial image search system 100 is assumed to be configured to discriminate the class based on one attribute type, but the present embodiment is not limited to such a configuration. The facial image search system 100 may be configured to discriminate the class based on a combination of a plurality of attributes.

FIG. 11 shows another example of the setting screen generated by the setting module 140. The setting screen shown in FIG. 11 is different from the setting screen shown in FIG. 3 in that the setting screen is generated in a state allowing a plurality of "Attribute Types" to be selected.

If the plurality of "Attribute Types" is set in the setting screen shown in FIG. 11, the setting module 140 generates a combination of each class of the attribute type. The setting module 140 generates a setting screen in such a way that the search server 40 as a transmission destination can be set for each generated combination.

Assume, for example, that "Age (Thee Classes)" and "Sex (Three Classes)" are selected as "Attribute Type". In this case, the setting module 140 generates combinations of nine patterns like "male (youth)", "male (middle age)", "male (old age)", "female (youth)", "female (middle age)", "female (old age)", "unknown (youth)", "unknown (middle age)", and "unknown (old age)".

Further, the setting module 140 may set middle classes for the attribute type of age. That is, the setting module 140 may be configured to handle, instead of three classes of "youth", "middle age", and "old age", five classes of "youth", "youth to middle age", "middle age", "middle age to old age", and "old age". The setting module 140 can also combine other attribute types by similar processing.

In such a case, the attribute discrimination module 150 discriminates a plurality of attributes based on facial features transmitted from the feature extraction module 130. The attribute discrimination module 150 discriminates a plurality of attributes corresponding to "Attribute Types" set by the setting information.

The control module 160 identifies the search server 40 as a transmission destination of personal data based on a plurality of attributes discriminated by the attribute discrimination module 150 and the transmission destination for each combination of classes of attribute types set by the setting module 140. The control module 160 controls the attribute discrimination module 150 so that personal data is transmitted to the identified search server 40.

The setting module 140 may be configured to automatically set the transmission destination for each combination of classes of attribute types by using the method shown in FIGS. 9 and 10.

In this case, the facial image search system 100 includes a counter corresponding to each combination of classes of attribute types or the like. FIG. 12 shows an example of the counter. The control module 160 transmits personal data to all or a plurality of the search servers 40 in the facial image search system 100. The control module 160 receives a search result from each of the search servers 40. The control module 160 identifies the search server 40 that has transmitted a search result as the first server and polls the counter corresponding to the plurality of attributes discriminated by the attribute discrimination module 150.

Accordingly, the facial image search system 100 can sort personal data more finely.

Functions described in the above embodiment may be constituted not only with use of hardware but also with use of software, for example, by making a computer read a program which describes the functions. Alternatively, the functions each may be constituted by appropriately selecting either software or hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A facial image search system, comprising: an image receiving module configured to receive image data;
    a face detection module configured to detect a facial image from the image data received by the image receiving module;
    a feature extraction module configured to extract a facial feature from the facial image detected by the face detection module;
    an attribute discrimination module configured to discriminate a class of an attribute based on the facial feature extracted by the feature extraction module;
    a plurality of search modules configured to store the facial feature as a database in advance, add the facial feature extracted by the feature extraction module to the database when received, calculate a degree of similarity between the facial feature extracted by the feature extraction module and the facial feature contained in the database, and output a search result based on the calculated degree of similarity;
    a setting module configured to generate setting information by selecting at least one attribute that corresponds to a plurality of classes, wherein each class is stored on one or more databases; and
    a control module configured to identify one or a plurality of search modules based on the setting information generated by the setting module and the class of the attribute discriminated by the attribute discrimination module and transmit the facial feature extracted by the feature extraction module to the identified search modules;
    wherein the plurality of search modules is configured to store the facial feature of a different attribute for each search module.

2. The facial image search system according to claim 1, wherein the attribute discrimination module discriminates at least one of an age of a person, presence/absence of glasses, presence/absence of a mask, and whether a hat is worn.

3. The facial image search system according to claim 1, wherein
    the setting module receives an operation signal based on an operation and updates the information indicating the search module associated with the attribute of the setting information search module based on the received operation signal.

4. The facial image search system according to claim 1, wherein
    the control module transmits the facial feature extracted by the feature extraction module to all the search modules, identifies one or a plurality of search modules for each attribute based on the search result output by each of the search modules, and transmits an identified result to the setting module and
    the setting module receives the identified result from the control module and updates the information indicating the search module associated with the attribute of the setting information based on the received identified result.

5. The facial image search system according to claim 1, wherein
    the setting module receives an operation signal based on an operation and modifies a type of the attribute associated with the information indicating the search module of the setting information based on the received operation signal.

6. The facial image search system according to claim 1, wherein
    the attribute discrimination module discriminates at least two or more attributes based on the facial feature extracted by the feature extraction module and
    the setting module generates the setting information by associating a combination of at least two or more attributes and the information indicating the search module.

7. The facial image search system according to claim 1, wherein
    the search module stores the facial feature contained in the database by further associating with a threshold, calculates the degree of similarity between the facial feature extracted by the feature extraction module and the facial feature contained in the database, and outputs the search result if the calculated degree of similarity is equal to or more than the threshold associated with the facial feature contained in the database.

8. The facial image search system according to claim 7, wherein
    the search module receives an operation signal based on an operation and modifies the threshold of the database based on the received operation signal.

9. The facial image search system according to claim 1, further comprising
    a display module configured to receive the search result output from the search module and display the received search result.

10. A facial image search method used for a facial image search system comprising a plurality of search modules configured to store a facial feature as a database in advance, add the facial feature to the database when received, calculate a degree of similarity between the received facial feature and the facial feature contained in the database, and output a search result based on the calculated degree of similarity, the method comprising:
    receiving image data;
    detecting a facial image from the received image data;
    extracting the facial feature from the detected facial image;
    discriminating a class of an attribute based on the extracted facial feature;
    generating setting information by selecting at least one attribute that corresponds to a plurality of classes, wherein each class is stored on one or more databases; and
    identifying one or a plurality of search modules based on the generated setting information and the class of the discriminated attribute to transmit the extracted facial feature to the identified search module, wherein the plurality of search modules store the facial feature of a different attribute for each search module.

11. A facial image search system, comprising: a computer including a processor; and a plurality of search servers, each search server including a database configured to store facial features of one or more persons, the facial features of the one or more persons stored in each database indicating a particular type of
- attribute associated with a respective search server, wherein the computer is configured to implement a setting indicator function that, for each of the plurality of search servers, sets an indicator as to the particular type of attribute that corresponds to a plurality of classes, wherein each class is stored on one or more databases;
- an image receiving function including receiving image data;
- a face detection function including detecting a facial image from the image data received through the image receiving function;
- a feature extraction function including extracting a facial feature from the facial image detected through the face detection function;
- an attribute discrimination function including discriminating the class of a particular type of individual attribute based on the facial feature extracted through the feature extraction function;
- an identifying function including identifying an appropriate search server, from among the plurality of search servers, by comparing the class of a particular type of individual attribute discriminated through the attribute discrimination function with each indicator set through the setting indicator function for each of the plurality of search servers;
- a transmitting function including transmitting to the appropriate search server the facial feature extracted through the feature extraction function;
- a similarity calculating function including calculating one or more similarity values measuring a similarity between the facial feature extracted through the feature extraction function and each of the facial features of the one or more persons stored in the appropriate search server's database; and
- an output function including outputting information related to the one or more similarity values calculated through the similarity calculating function.

12. The facial image search system according to claim 11, wherein the facial features stored in each particular database indicate a different type of attribute from every other type of attribute indicated by the facial features stored in every database other than the each particular database.

* * * * *